(12) United States Patent
Yamamoto et al.

(10) Patent No.: US 11,649,887 B2
(45) Date of Patent: May 16, 2023

(54) GEAR DEVICE

(71) Applicant: SUMITOMO HEAVY INDUSTRIES, LTD., Tokyo (JP)

(72) Inventors: Akira Yamamoto, Kanagawa (JP); Mitsuhiro Tamura, Kanagawa (JP); Kenji Shirouzu, Kanagawa (JP); Masahiro Watanabe, Kanagawa (JP); Toshiaki Matoba, Osaka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 129 days.

(21) Appl. No.: 17/349,502

(22) Filed: Jun. 16, 2021

(65) Prior Publication Data
US 2021/0396304 A1    Dec. 23, 2021

(30) Foreign Application Priority Data

Jun. 17, 2020 (JP) .............................. JP2020-104763

(51) Int. Cl.
   *F16H 49/00* (2006.01)
   *F16H 1/32* (2006.01)
   *F16H 55/06* (2006.01)

(52) U.S. Cl.
   CPC ............ *F16H 49/001* (2013.01); *F16H 1/32* (2013.01); *F16H 55/06* (2013.01); *F16H 2049/003* (2013.01); *F16H 2055/065* (2013.01)

(58) Field of Classification Search
   CPC ... F16H 49/001; F16H 2049/003; F16H 55/06
   See application file for complete search history.

(56) References Cited

U.S. PATENT DOCUMENTS

| | | | |
|---|---|---|---|
| 5,074,828 A * | 12/1991 | Ellis | B29C 70/347 474/161 |
| 10,132,398 B2 * | 11/2018 | Kobayashi | B23P 15/14 |
| 10,895,306 B2 | 1/2021 | Tamura et al. | |
| 2002/0174741 A1 * | 11/2002 | Kobayashi | F16H 57/041 74/640 |
| 2008/0314180 A1 * | 12/2008 | Iwano | F16H 55/06 74/425 |
| 2017/0321793 A1 * | 11/2017 | Wu | B32B 9/007 |
| 2018/0266533 A1 * | 9/2018 | Tamura | F16H 49/001 |
| 2019/0390735 A1 * | 12/2019 | Tamura | F16H 55/06 |
| 2020/0025277 A1 * | 1/2020 | Tamura | F16H 1/32 |

(Continued)

FOREIGN PATENT DOCUMENTS

| | | |
|---|---|---|
| DE | 10 2019 117 690 A1 | 1/2020 |
| DE | 10 2021 110 900 A1 | 11/2021 |

(Continued)

OTHER PUBLICATIONS

Office Action issued in German Application No. 10 2021 115 343.3, dated Jun. 2, 2022.

(Continued)

*Primary Examiner* — Terence Boes
(74) *Attorney, Agent, or Firm* — Michael Best & Friedrich LLP

(57) ABSTRACT

A gear device includes an external gear, and an internal gear that meshes with the external gear. The external gear is formed of metal. The internal gear is formed of a carbon fiber reinforced resin.

13 Claims, 3 Drawing Sheets

(56) References Cited

U.S. PATENT DOCUMENTS

| | | | |
|---|---|---|---|
| 2020/0278017 A1* | 9/2020 | Hofmann | F16H 49/001 |
| 2020/0325976 A1* | 10/2020 | Tamura | F16H 57/023 |
| 2021/0354348 A1 | 11/2021 | Tamura et al. | |
| 2021/0381589 A1 | 12/2021 | Tamura et al. | |

FOREIGN PATENT DOCUMENTS

| | | |
|---|---|---|
| DE | 10 2021 112 494 A1 | 12/2021 |
| JP | 2007-315581 A | 12/2007 |
| JP | 2007315581 A * | 12/2007 |

OTHER PUBLICATIONS

Yasuyuki Hashimoto et al., "High Strength Resin Gear Materials", Shin-Kobe Technical Report, Feb. 2006, pp. 10-15, No. 16, Shin-Kobe Electric Machinery Co., Ltd., Japan.

* cited by examiner

GEAR DEVICE

RELATED APPLICATIONS

The content of Japanese Patent Application No. 2020-104763, on the basis of which priority benefits are claimed in an accompanying application data sheet, is in its entire incorporated herein by reference.

BACKGROUND

Technical Field

A certain embodiment of the present invention relates to a gear device.

Description of Related Art

In recent years, a resin material has been increasingly applied to a gear material in many cases in order to mainly achieve weight reduction (for example, refer to the related art).

When a gear is formed of the resin material, it is desirable to adopt fiber reinforced resins which can achieve higher strength, and out of the fiber reinforced resins, it is desirable to adopt a carbon fiber reinforced resin in which a carbon fiber is used as a reinforcing fiber.

SUMMARY

According to an embodiment of the present invention, there is provided a gear device including an external gear, and an internal gear that meshes with the external gear.

The external gear is formed of metal.

The internal gear is formed of a carbon fiber reinforced resin.

According to another embodiment of the present invention, there is provided a gear device including an external gear, and an internal gear that meshes with the external gear.

The internal gear is formed of metal.

The external gear is formed of a carbon fiber reinforced resin.

DETAILED DESCRIPTION

However, when the carbon fiber reinforced resin is simply applied to a gear that performs external meshing as in the related art, the carbon fiber exposed on a tooth surface attacks a mating gear. Consequently, the resin-made gear itself and the mating gear are damaged at an early stage.

It is desirable to suitably apply a carbon fiber reinforced resin to a gear material.

Hereinafter, an embodiment according to the present invention will be described in detail with reference to the drawings.

Configuration of Gear Device

Figure 1:
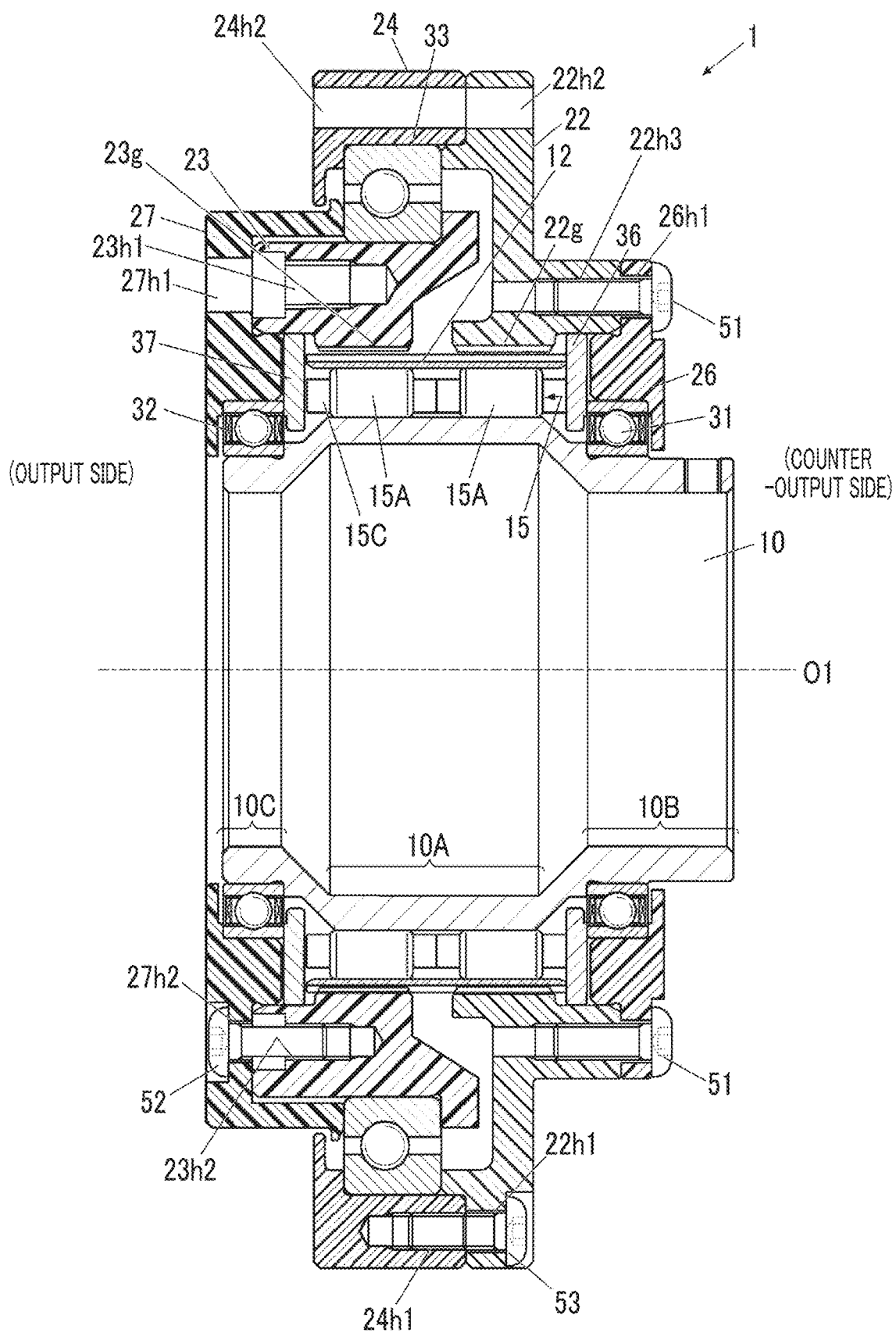
FIG. 1 is a sectional view illustrating a gear device according to an embodiment.

FIG. 1 is a sectional view illustrating a gear device 1 according to the present embodiment.

As illustrated in the drawing, the gear device 1 is a bending meshing type gear device having a cylindrical type, and includes a wave generator shaft 10, an external gear 12, a first internal gear 22, a second internal gear 23, and a wave generator bearing 15. Furthermore, the gear device 1 includes a casing 24, a first cover 26, a second cover 27, input bearings 31 and 32, and a main bearing 33.

The wave generator shaft 10 is a hollow cylindrical shaft rotating around a rotation axis O1, and has a wave generator 10A having a non-circular outer shape (for example, an elliptical shape) in a cross section perpendicular to the rotation axis O1, and shaft portions 10B and 10C provided on both sides in an axial direction of the wave generator 10A. The elliptical shape is not limited to a geometrically exact ellipse, and includes a substantially elliptical shape. The shaft portions 10B and 10C are shafts having a circular outer shape in a cross section perpendicular to the rotation axis O1. A drive source (not illustrated) such as a motor is connected to the wave generator shaft 10, and a driving force is input to the wave generator shaft 10.

In the following description, a direction extending along the rotation axis O1 will be referred to as the "axial direction", a direction perpendicular to the rotation axis O1 will be referred to as a "radial direction", and a rotation direction around the rotation axis O1 will be referred to as a "circumferential direction". In the axial direction, a side where a decelerated rotating motion is output (left side in the drawing) will be referred to as an "output side", and a side opposite to the output side (right side in the drawing) will be referred to as a "counter-output side".

The external gear 12 is a flexible and cylindrical member formed around the rotation axis O1, and teeth are provided on an outer periphery of the external gear 12.

The wave generator bearing 15 is disposed between the wave generator 10A and the external gear 12. The wave generator bearing 15 has a plurality of rolling elements (rollers) 15A and a holder 15C for holding the plurality of rolling elements 15A. The plurality of rolling elements 15A roll on an outer peripheral surface of the wave generator 10A and an inner peripheral surface of the external gear 12, as a rolling contact surface (also referred to as a trajectory surface). The wave generator bearing 15 may have an inner ring separate from the wave generator 10A, or an outer ring separate from the external gear 12. Alternatively, the wave generator bearing 15 may have both of these.

Spacer rings 36 and 37 serving as regulating members that abut against the external gear 12 and the wave generator bearing 15 and that regulate both of their movements in the axial direction are provided on both sides of the external gear 12 and the wave generator bearing 15 in the axial direction.

The first internal gear 22 and the second internal gear 23 each have teeth 22g and 23g on inner peripheral portions thereof, respectively. The teeth 22g and 23g are aligned in the axial direction, the teeth 22g and 23g of one of the first internal gear 22 and the second internal gear 23 mesh with the teeth of the external gear 12 on one side from a center in the axial direction, and the teeth 22g and 23g of the other of the first internal gear 22 and the second internal gear 23 mesh with the teeth of the external gear 12 on the other side from the center in the axial direction.

An outer peripheral portion of the first internal gear 22 functions as a casing that covers an interior of the gear device 1 together with the casing 24. The counter-output side of the first internal gear 22 has a projecting portion to be connected to a first cover 26, and the projecting portion is provided with a connecting hole 22h3 into which a connection member (a bolt, etc., hereinafter the same applies) 51 for connecting the first cover 26 is screwed. Furthermore, the outer peripheral portion of the first internal gear 22 is provided with a connecting hole 22$h$1 for connecting the casing 24 via a connection member 53, and a connecting hole 22$h$2 for connecting an external support member by joint fastening together with the casing 24. Female screws may be formed in the connecting holes 22$h$1 to 22$h$3 when the connection members are screwed, and may not be formed when the connection members pass therethrough.

The second internal gear 23 has a connecting hole 23$h$1 for connecting an external member serving as a drive target and a connecting hole 23$h$2 for connecting the second cover 27.

The casing 24 is connected to the first internal gear 22 via the connection member 53. The casing 24 covers an outer side in the radial direction of a portion where the teeth 22$g$ and 23$g$ of the first internal gear 22 and the second internal gear 23 mesh with the external gear 12 together with the first internal gear 22. The casing 24 has a connecting hole 24$h$1 into which the connection member 53 is screwed, and a connecting hole 24$h$2 communicating with the connecting hole 22$h$2 of the first internal gear 22.

The first cover 26 covers an outer peripheral portion of the wave generator shaft 10 on the counter-output side. The first cover 26 has a connecting hole 26$h$1 communicating with the connecting hole 22$h$3 of the first internal gear 22, and is connected to the first internal gear 22 via the connection member 51.

The second cover 27 covers the outer peripheral portion of the wave generator shaft 10 on the output side. The second cover 27 has connecting holes 27$h$1 and 27$h$2, each communicating with the connecting holes 23$h$1 and 23$h$2 of the second internal gear 23, respectively. The connecting hole 27$h$1 is a through-hole for joint fastening the second cover 27 between the external member serving as the drive target and the second internal gear 23. The connecting hole 27$h$2 is a through-hole having a seating surface of the connection member 52. The inserted connection member 52 is screwed into the connecting hole 23$h$2 of the second internal gear 23 so that the second cover 27 alone is connected to the second internal gear 23.

The input bearing 31 is disposed between the shaft portion 10B of the wave generator shaft 10 and the first cover 26. The first cover 26 supports the wave generator shaft 10 to be rotatable via the input bearing 31.

The input bearing 32 is disposed between the shaft portion 10C of the wave generator shaft 10 and the second cover 27. The second cover 27 supports the wave generator shaft 10 to be rotatable via the input bearing 32.

The main bearing 33 has an inner ring, an outer ring, and a rolling element, and is disposed between the second internal gear 23 and the casing 24. The casing 24 supports the second internal gear 23 to be rotatable via the main bearing 33. In FIG. 1, a ball bearing is illustrated as the main bearing 33. However, any type of bearing such as a roller bearing, a cross roller bearing, an angular ball bearing, and a tapered bearing, may be used. The outer ring of the main bearing 33 may be configured to be integrated with the casing 24.

Material of Each Member (Other than Gear)

A material of each member other than the gear is not particularly limited. In the present embodiment, the materials are configured as follows.

The casing 24, the first cover 26, and the second cover 27 are formed of a resin material. As the resin material, a resin alone or a resin containing a reinforcing fiber is applicable. For example, various resin materials such as a poly ether ether ketone (PEEK) material and polyacetal or polyoxymethylene (POM) can be adopted. As the resin containing the reinforcing fiber, a composite material such as carbon fiber reinforced plastic (CFRP), a composite material of the resin and another material, and a baking material (paper baking material or cloth baking material) are applicable. Since the members are formed of the resin, it is possible to achieve low cost and weight reduction of the gear device 1.

The wave generator shaft 10 and the spacer rings 36 and 37 are formed of a metal material such as a steel material. Although not particularly limited, more specifically, the wave generator shaft 10 is formed of a steel material such as chromium molybdenum steel. The spacer rings 36 and 37 are formed of a steel material such as a high carbon chrome bearing steel material.

Material of External Gear and Internal Gear

The external gear 12 is formed of a steel material (metal material) such as nickel chrome molybdenum steel.

On the other hand, the first internal gear 22 and the second internal gear 23 are formed of a carbon fiber reinforced resin material in which a carbon fiber is contained as a reinforcing fiber in a base resin. As the base resin, for example, various resin materials such as a poly ether ether ketone (PEEK) material and polyacetal or polyoxymethylene (POM) can be adopted. When the reinforcing fiber contained in the resin material is a fiber which is not tied in a cloth shape, injection molding or compression molding can be performed by using the resin material. When the material contained in the resin material is a fiber which is tied in a cloth shape or a piece shape, compression molding can be performed by using the resin material. At least one of the first internal gear 22 and the second internal gear 23 may be formed of the carbon fiber reinforced resin material.

In the present embodiment, as described above, the external gear 12 is formed of the metal. In contrast, the internal gears (first internal gear 22 and second internal gear 23) which mesh with the external gear 12 are formed of the carbon fiber reinforced resin.

In the related art, according to common knowledge of those skilled in the art, it is difficult to adopt the carbon fiber reinforced resin as the gear material as in the present embodiment. The reason is as follows. The carbon fiber exposed on the tooth surface attacks a mating gear. Consequently, the resin-made gear itself and the mating gear are damaged at an early stage.

In this regard, the present inventors defied the above-described common knowledge in the technical field of gears, and found the following. The above-described problem occurs in a case of meshing (external meshing) between the external gears having the tooth protruding on the outer periphery. In a case of meshing (internal meshing) between the external gear and the internal gear, early damage can be suppressed even when the gear formed of the carbon fiber reinforced resin is used.

The reason is considered to be as follows. A tooth contact pressure and a sliding speed (relative sliding speed between the external gear and the internal gear) in the case of the internal meshing decrease, compared to the case of the external meshing.

In the internal meshing, a convex tooth and a concave tooth mesh with each other. Accordingly, a contact area of the tooth surface increases, and the tooth contact pressure decreases, compared to the external meshing in which the convex teeth mesh with each other.

In addition, in the internal meshing, the meshing gears are rotated in the same direction. Accordingly, the sliding speed decreases, compared to the external meshing. The inventors verified various types of gear devices, and obtained satisfactory results in the internal meshing when the sliding speed was approximately 1,000 mm/s or lower (case of input rotation speed: approximately 2,000 rpm). The above-described numerical value "2,000 rpm" of the input rotation speed does not limit the input rotation speed when the gear device is used as a product.

The second internal gear 23 has a fluid solidification portion whose outer surface is formed by solidifying a molten resin material (that is, a fluid material), and a machined portion whose outer surface is subjected to machining. The outer surface means a surface that comes into contact with air when the second internal gear 23 is viewed alone. The machining is a concept that includes polishing. A tool mark (tool trace) of a tool is added to the machined portion. On the other hand, the above-described tool mark does not appear in the fluid solidification portion. The machined portion and the fluid solidification portion can be distinguished from each other by the presence or absence of the above-described tool mark. Furthermore, when the fluid solidification portion is formed by injection molding, any location of the fluid solidification portion includes a shape of a gate portion through which a mold is internally filled with the molten resin material.

The machined portion of the second internal gear 23 includes the tooth 23g. A method of machining the tooth 23g is not particularly limited. However, for example, the method includes tooth forming using a gear shaper, a skiving cutter, or a hob. Alternatively, the method may include polishing using a grindstone. The carbon fiber may be exposed on the tooth surface of the tooth 23g by the machining. The carbon fiber may be exposed on the tooth surface without performing the machining.

High machining accuracy can be obtained in the machined portion. However, the cost increases by the amount of additional processes. Accordingly, it is preferable that only the tooth 23g is set as the machined portion.

The fluid solidification portion of the second internal gear 23 includes a portion other than the machined portion.

For example, the fluid solidification portion is formed by injection molding, but may be formed by compression molding of the fiber reinforced resin. An outer shape of the fluid solidification portion has a shape that conforms to a mold.

As in the second internal gear 23, the first internal gear 22 has the fluid solidification portion whose outer surface is formed by solidifying the molten resin material, and the machined portion whose outer surface is subjected to machining.

The machined portion of the first internal gear 22 includes the tooth 22g. The carbon fiber may be exposed on the tooth surface of the tooth 22g by the machining. The carbon fiber may be exposed on the tooth surface without performing the machining.

The fluid solidification portion of the first internal gear 22 includes a portion other than the machined portion.

Operation of Gear Device

When the wave generator shaft 10 is rotationally driven by a drive source such as a motor, the movement of the wave generator 10A is transmitted to the external gear 12. In this case, the external gear 12 is regulated to have a shape along the outer peripheral surface of the wave generator 10A, and is bent into an elliptical shape having a major axis portion and a minor axis portion, when viewed in the axial direction. Furthermore, the external gear 12 meshes with the fixed first internal gear 22 in the major axis portion. Therefore, the external gear 12 is not rotated at the same rotation speed as that of the wave generator 10A, and the wave generator 10A is relatively rotated inside the external gear 12. Then, in response to the relative rotation, the external gear 12 is bent and deformed so that a major axis position and a minor axis position move in the circumferential direction. A period of the deformation is proportional to a rotation period of the wave generator shaft 10.

When the external gear 12 is bent and deformed, the major axis position moves so that a meshing position between the external gear 12 and the first internal gear 22 is changed in the rotation direction. Here, for example, when the number of teeth of the external gear 12 is 100 and the number of teeth of the first internal gear 22 is 102, each time the meshing position is rotated once, meshing teeth of the external gear 12 and the first internal gear 22 are displaced. In this manner, the external gear 12 is rotated (rotation). According to the above-described number of teeth, the rotating motion of the wave generator shaft 10 is decelerated at a reduction ratio of 100:2, and is transmitted to the external gear 12.

On the other hand, the external gear 12 also meshes with the second internal gear 23. Accordingly, the meshing position between the external gear 12 and the second internal gear 23 is also changed in the rotation direction by the rotation of the wave generator shaft 10. Here, when the number of teeth of the second internal gear 23 and the number of teeth of the external gear 12 are equal to each other, the external gear 12 and the second internal gear 23 are not relatively rotated. The rotating motion of the external gear 12 is transmitted to the second internal gear 23 at a reduction ratio of 1:1. In this manner, the rotating motion of the wave generator shaft 10 is decelerated at a reduction ratio of 100:2, and is transmitted to the second internal gear 23 and the second cover 27. The rotating motion is output to an external member serving as a drive target.

In this case, the internal gears (first internal gear 22 and second internal gear 23) formed of the carbon fiber reinforced resin are in the internal meshing with the external gear 12 formed of the metal.

Therefore, when the gear formed of the carbon fiber reinforced resin is in the external meshing, the carbon fiber exposed on the tooth surface of the gear may attack the mating gear, and may cause damage to the mating gear. However, the internal gears formed of the carbon fiber reinforced resin are in the internal meshing in the present embodiment. Accordingly, the tooth contact pressure and the sliding speed can be reduced, and damage to the gear can be suppressed.

Technical Effects of Present Embodiment

As described above, according to the present embodiment, the external gear 12 is formed of the metal, and the internal gears (first internal gear 22 and second internal gear 23) are formed of the carbon fiber reinforced resin. That is, the internal gears formed of the carbon fiber reinforced resin are in the internal meshing with the metal external gear 12.

In this manner, compared to the related art in which the gear formed of the carbon fiber reinforced resin is in the external meshing, the tooth contact pressure and the sliding speed can be reduced, and damage to the gear can be suppressed.

Therefore, the carbon fiber reinforced resin can be suitably applied to the gear material. As a result, it is possible to suitably achieve weight reduction, high strength, and long duration of the gear.

In addition, in the present embodiment, (intermediate body of) the first internal gear 22 and the second internal gear 23 are formed by injection molding, and thereafter, the tooth portion is formed by machining. Accordingly, while manufacturing cost is reduced, gear accuracy can be improved (compared to a case where the tooth portion is formed only by injection molding). In addition, even when the carbon fiber is exposed on the tooth surface by machining the tooth portion, the tooth contact pressure and the sliding speed decrease. Therefore, damage to the gear can be suppressed.

In the present embodiment, the bending meshing type gear device is adopted as the gear device. In this manner, a configuration is realized in which the relative sliding speed between the external gear and the internal gear is 1,000 mm/s or lower when the input rotation speed is 2,000 rpm.

MODIFICATION EXAMPLE

Subsequently, an example in which the present invention is applied to an eccentric oscillating type gear device will be described.

Figure 2:
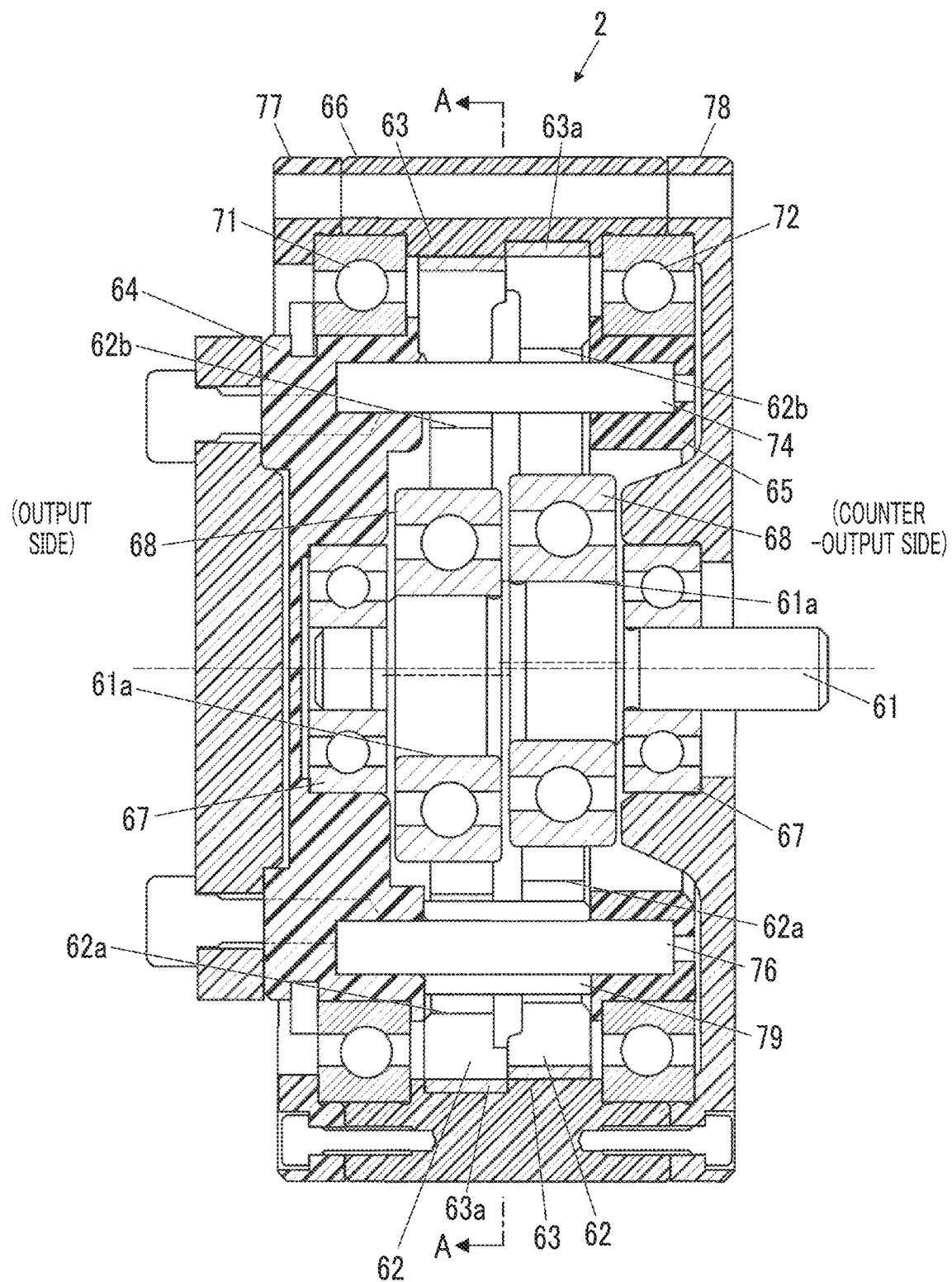
FIG. 2 is a sectional view illustrating a gear device according to a modification example of the embodiment.
Figure 3:
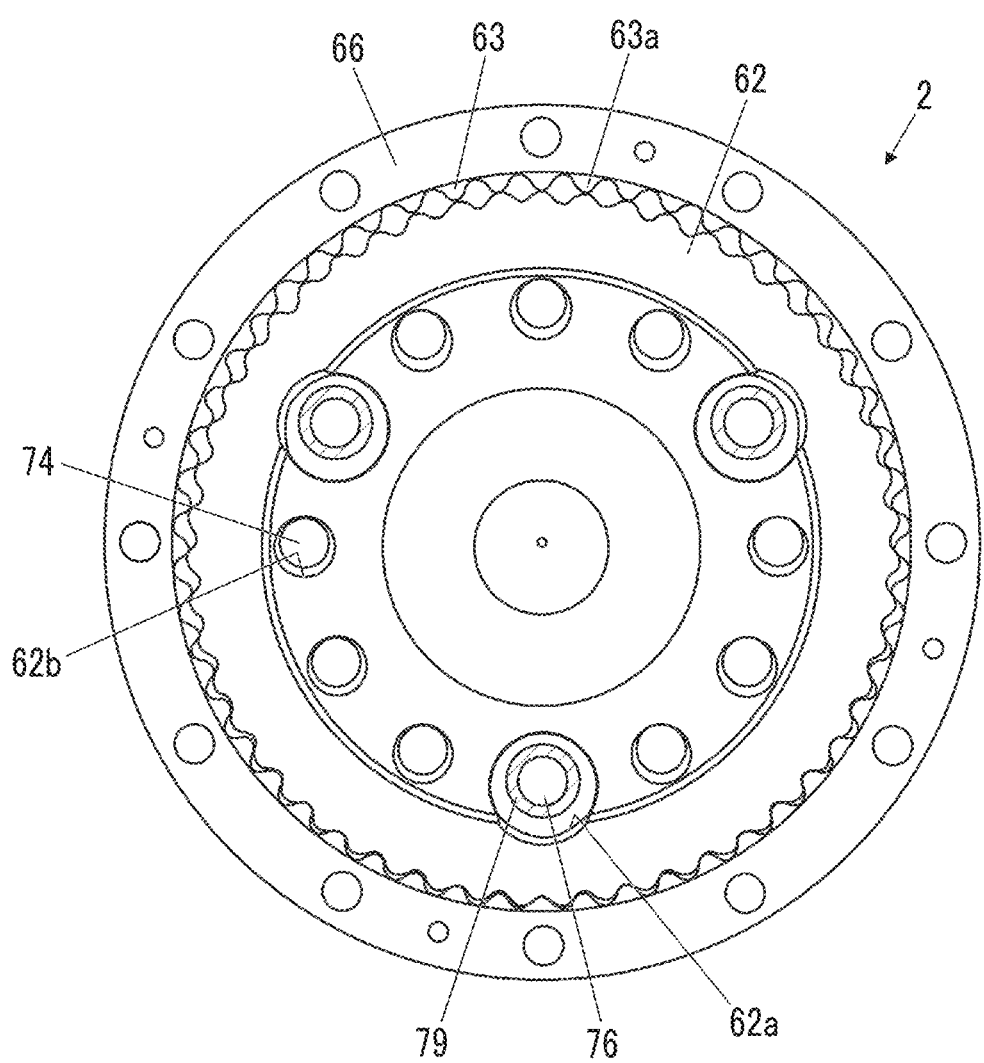
FIG. 3 is a sectional view taken along line A-A in FIG. 2.

FIG. 2 is a sectional view illustrating a gear device 2 according to the present modification example, and FIG. 3 is a sectional view taken along line A-A in FIG. 2.

As illustrated in FIGS. 2 and 3, the gear device 2 according to the present modification example is the eccentric oscillating type gear device, and includes an input shaft 61, an external gear 62, an internal gear 63, a first carrier 64, a second carrier 65, a casing 66, main bearings 71 and 72, an inner pin 74, and a carrier pin 76.

The input shaft 61 has a plurality of (two in the present modification example) eccentric portions 61*a*. A counter-output side of the input shaft 61 is supported by the second cover 78 via an input shaft bearing 67, and an output side opposite thereto is supported by the first carrier 64 via the input shaft bearing 67.

The external gear 62 is individually provided corresponding to each of the plurality of eccentric portions 61*a*, and is supported to be rotatable by the corresponding eccentric portion 61*a* via an eccentric bearing 68. In the external gear 62, three carrier pin holes 62*a* into which the carrier pin 76 is inserted, and nine inner pin holes 62*b* into which the inner pin 74 is inserted are formed at positions offset from an axial center of the external gear 62. Corrugated teeth are formed on the outer periphery of the external gear 62.

In addition, the external gear 62 is formed of the metal as in the external gear 12 according to the above-described embodiment.

The internal gear 63 has an internal tooth 63*a* integrally formed on the inner peripheral portion of the casing 66, and the internal tooth 63*a* meshes with the tooth of the external gear 62.

In addition, the internal gear 63 is formed of the carbon fiber reinforced resin as in the internal gear according to the above-described embodiment. As in the above-described embodiment, the internal gear 63 may have the tooth portion formed by machining after injection molding, or the carbon fiber may be exposed on the tooth surface.

The first carrier 64 is disposed in a lateral portion on the output side of the external gear 62, and the second carrier 65 is disposed in a lateral portion on the counter-output side of the external gear 62. The first carrier 64 and the second carrier 65 are supported to be rotatable by the casing 66 via the first main bearing 71 and the second main bearing 72. The first carrier 64 and the second carrier 65 are connected via the carrier pin 76 and the inner pin 74. The carrier pin 76 and the inner pin 74 penetrate the plurality of external gears 62 in the axial direction, at positions offset from the axis in the radial direction of the external gear 62.

The casing 66 has the internal gear 63 on an inner peripheral portion thereof. A first cover 77 which covers the output side and a second cover 78 which covers the counter-output side are fixed to the casing 66.

The main bearing 71 is disposed between the first carrier 64 and the casing 66, and the main bearing 72 is disposed between the second carrier 65 and the casing 66.

The inner pin 74 is inserted into the inner pin hole 62*b* in a state of having a gap. One end thereof is fitted into the first carrier 64, and the other end is fitted into the second carrier 65, respectively.

The carrier pin 76 is inserted into the carrier pin hole 62*a* in a state of having a gap. One end thereof is fitted into the first carrier 64, and the other end is fitted into the second carrier 65, respectively. The carrier pin 76 is surrounded by a tubular spacer 79. The carrier pin 76 functions as a connection member that contributes only to connection between the first carrier 64 and the second carrier 65.

A portion of the carrier pin 76 and the inner pin 74 may be formed integrally with the carriers 64 and 65.

According to this configuration, in the gear device 2, when rotational power is input to the input shaft 61, the eccentric portion 61*a* of the input shaft 61 is rotated around a rotation center line, and the external gear 62 oscillates due to the eccentric portion 61*a*. In this case, the external gear 62 oscillates so that its own axis is rotated around the rotation center line of the input shaft 61. When the external gear 62 oscillates, the meshing position between the external gear 62 and the internal gear 63 is sequentially displaced. As a result, each time the input shaft 61 is rotated once, any one rotation of the external gear 62 and the internal gear 63 is generated by the amount corresponding to a difference in the number of teeth between the external gear 62 and the internal gear 63. In the present modification example, the external gear 62 rotates, and decelerated rotation is output from the first carrier 64.

In the present modification example, advantageous effects the same as those of the above-described embodiment can also be obtained.

That is, the internal gear formed of the carbon fiber reinforced resin is in the internal meshing with the external gear 12 formed of the metal. Accordingly, compared to the related art, the tooth contact pressure and the sliding speed can be reduced, and damage to the gear can be suppressed. Therefore, the carbon fiber reinforced resin can be suitably applied to the gear material. As a result, it is possible to suitably achieve weight reduction, high strength, and long duration of the gear.

In the gear device 2 according to the present modification example, the inventors also obtained satisfactory results when the sliding speed (relative sliding speed between the external gear 62 and the internal gear 63) is approximately 1,000 mm/s or lower (input rotation speed of the input shaft 61: approximately 2,000 rpm). The above-described numerical value "2,000 rpm" of the input rotation speed does not limit the input rotation speed when the gear device is used as a product. That is, in the present modification example, the eccentric oscillating type gear device is adopted as the gear device. In this manner, a configuration is realized in which the relative sliding speed between the external gear and the internal gear is 1,000 mm/s or lower when the input rotation speed is 2,000 rpm.

Other

Hitherto, the embodiment according to the present invention has been described. However, the present invention is not limited to the above-described embodiment and the modification example.

For example, in the above-described embodiment and the modification example, the external gear is formed of the metal, and the internal gear is formed of the carbon fiber reinforced resin. However, (at least one of) the internal gears may be formed of the metal, and the external gear may be formed of the carbon fiber reinforced resin.

In addition, in the above-described embodiment and the modification example, an example has been described in which the gear device according to the present invention is applied to the bending meshing type gear device having a cylindrical type and the eccentric oscillating type gear device having a center crank type. However, the gear device according to the present invention is widely applicable to gear devices including the internal meshing gears. The gear device according to the present invention is also applicable to a bending meshing type gear device other than the cylindrical type (for example, a so-called cup type or a silk hat type) or an eccentric oscillating type gear device other than the center crank type (for example, a distribution type), and is also suitably applicable to gear devices having other types such as a simple planetary gear.

In addition, details in the above-described embodiment can be appropriately changed within the scope not departing from the concept of the invention.

It should be understood that the invention is not limited to the above-described embodiment, but may be modified into various forms on the basis of the spirit of the invention. Additionally, the modifications are included in the scope of the invention.

What is claimed is:

1. A gear device comprising:
an external gear;
an internal gear that meshes with the external gear; and
an input shaft,
wherein the external gear is formed of metal,
the internal gear is formed of a carbon fiber reinforced resin, and
the input shaft is configured such that when an input rotation speed of 2,000 rpm is input to the input shaft, a relative sliding speed between the external gear and the internal gear is 1,000 mm/s or lower.

2. The gear device according to claim 1,
wherein in the internal gear, a carbon fiber is exposed on a tooth surface.

3. The gear device according to claim 2,
wherein the internal gear has a fluid solidification portion formed by solidifying the carbon fiber reinforced resin and a machined portion subjected to machining, and
the machined portion includes a tooth.

4. The gear device according to claim 1,
wherein the gear device is a bending meshing gear device or an eccentric oscillating gear device.

5. The gear device according to claim 4,
wherein the gear device is a bending meshing gear device,
the gear device further comprises a wave generator shaft to which a driving force is input, and
the wave generator shaft is a hollow cylindrical shaft rotating around a rotation axis.

6. The gear device according to claim 5,
wherein the wave generator shaft includes a wave generator having a substantially elliptical outer shape in a cross section perpendicular to the rotation axis, and shaft portions provided on both sides of the wave generator in an axial direction and having a substantially circular outer shape in a cross section perpendicular to the rotation axis.

7. The gear device according to claim 6,
wherein the external gear is a flexible and substantially cylindrical member formed around the rotation axis, and is provided with teeth on an outer periphery thereof.

8. The gear device according to claim 7,
wherein the internal gear includes a first internal gear and a second internal gear,
the first internal gear and the second internal gear each include teeth on an inner periphery thereof, and
the teeth are aligned in the axial direction, the teeth of one of the first internal gear and the second internal gear mesh with the teeth of the external gear on one side from a center in the axial direction, and the teeth of the other of the first internal gear and the second internal gear mesh with the teeth of the external gear on the other side from the center in the axial direction.

9. The gear device according to claim 4,
wherein the gear device is an eccentric oscillating gear device,
a driving force is input to the input shaft, and
the input shaft includes a plurality of eccentric portions.

10. The gear device according to claim 9,
wherein the external gear is individually provided corresponding to each of the plurality of eccentric portions, and is supported to be rotatable by the corresponding eccentric portion via an eccentric bearing.

11. The gear device according to claim 10,
wherein corrugated teeth are formed on an outer periphery of the external gear, and
corrugated teeth are formed on an inner periphery of the internal gear.

12. A gear device comprising:
an external gear;
an internal gear that meshes with the external gear; and
an input shaft,
wherein the internal gear is formed of metal,
the external gear is formed of a carbon fiber reinforced resin, and
the input shaft is configured such that when an input rotation speed of 2,000 rpm is input to the input shaft, a relative sliding speed between the external gear and the internal gear is 1,000 mm/s or lower.

13. The gear device according to claim 1,
wherein meshing between the external gear and the internal gear is meshing between a convex tooth and a concave tooth.

* * * * *